United States Patent [19]
Broadbent

[11] Patent Number: 5,124,908
[45] Date of Patent: Jun. 23, 1992

[54] USER INTERACTIVE EXPERT MACHINE CONTROLLER

[75] Inventor: John Broadbent, Bloomingdale, Ill.

[73] Assignee: Ellis Corporation, Itasca, Ill.

[21] Appl. No.: 512,827

[22] Filed: Apr. 23, 1990

[51] Int. Cl.[5] .............................. G06F 11/32
[52] U.S. Cl. .................... 364/188; 364/184; 395/147; 395/161
[58] Field of Search ............ 364/188, 189, 521, 40 D, 364/18 A; 371/29.1; 395/144, 145, 147, 155, 161

[56] References Cited

U.S. PATENT DOCUMENTS

| | | | |
|---|---|---|---|
| 3,789,801 | 1/1974 | Caputo et al. | 371/29.1 |
| 4,158,431 | 6/1979 | van Baxel et al. | 371/16.4 |
| 4,245,309 | 1/1981 | Kiefer . | |
| 4,245,310 | 1/1981 | Kiefer . | |
| 4,323,266 | 4/1982 | Savage . | |
| 4,328,600 | 5/1982 | Bochan . | |
| 4,520,576 | 6/1985 | Vander Molen . | |
| 4,521,885 | 6/1985 | Melocik et al. | 371/29.1 |
| 4,697,243 | 9/1987 | Moore et al. | 364/184 |
| 4,942,514 | 7/1990 | Miyagaki et al. | 364/189 |
| 4,955,213 | 9/1990 | Ohsugi et al. | 364/400 |
| 4,970,664 | 11/1990 | Kaiser et al. | 364/521 |
| 4,977,394 | 12/1990 | Manson et al. | 340/679 |

*Primary Examiner*—Jerry Smith
*Assistant Examiner*—Patrick D. Muir
*Attorney, Agent, or Firm*—Mason, Kolehmainen, Rathburn & Wyss

[57] ABSTRACT

A machine controller apparatus provides simple, effective, efficient and reliable control operation, facilitates repair and periodic maintenance and eliminates the need for either an operating manual or a service manual for the machine being controlled. The machine control apparatus includes a processor device for performing a plurality of predetermined control and logical operations. Memory is coupled to the processor means for storing predetermined machine characteristic data and a user input device is coupled to the processor device for receiving user input selections. The processor device is responsive to both the predetermined machine characteristic data stored by the memory and a received predefined one of the user input selections for performing at least one of the plurality of predetermined control and logical operations. A display device is coupled to the processor device for displaying a plurality of menu-specific user input selections responsive to the received predefined one of the user input selections.

17 Claims, 2 Drawing Sheets

INDEX OF CONTENTS

1. WIRING DIAGRAM
2. LOGIC DIAGRAM
3. MACHINE OPERATION
4. HYDRAULIC CIRCUIT
5. PARTS LIST
6. RECOMMENDED SERVICE
7. SERVICE HISTORY
8. MECHANICAL SYSTEMS

| F1 | F2 | F3 | F4 | F5 | F6 | F7 | F8 | F9 | F10 | F11 |

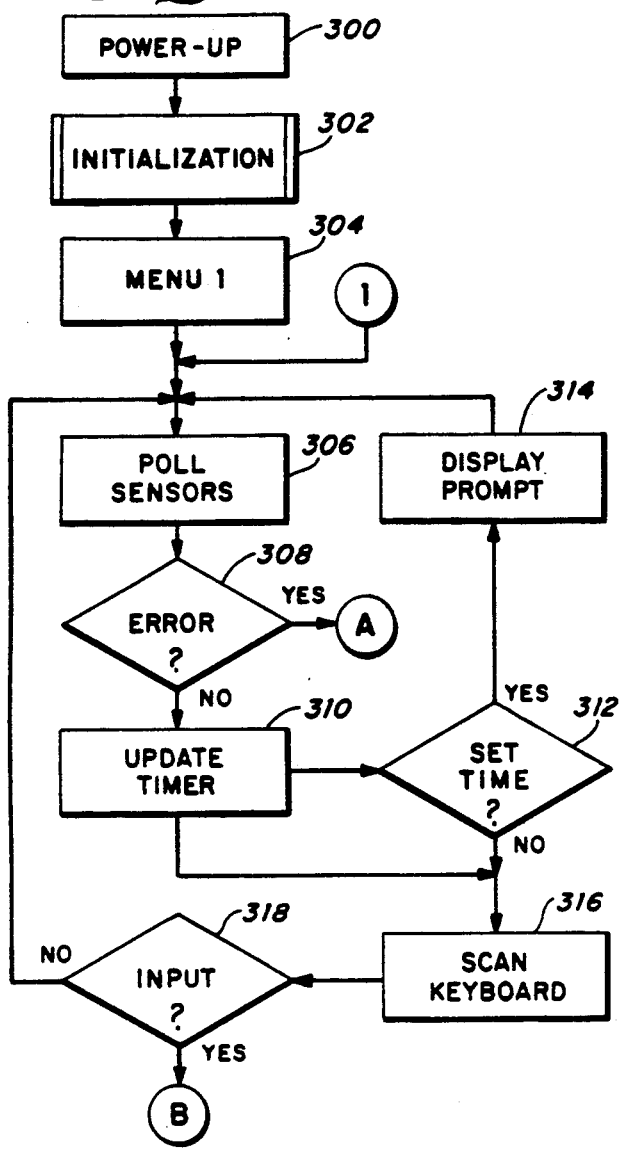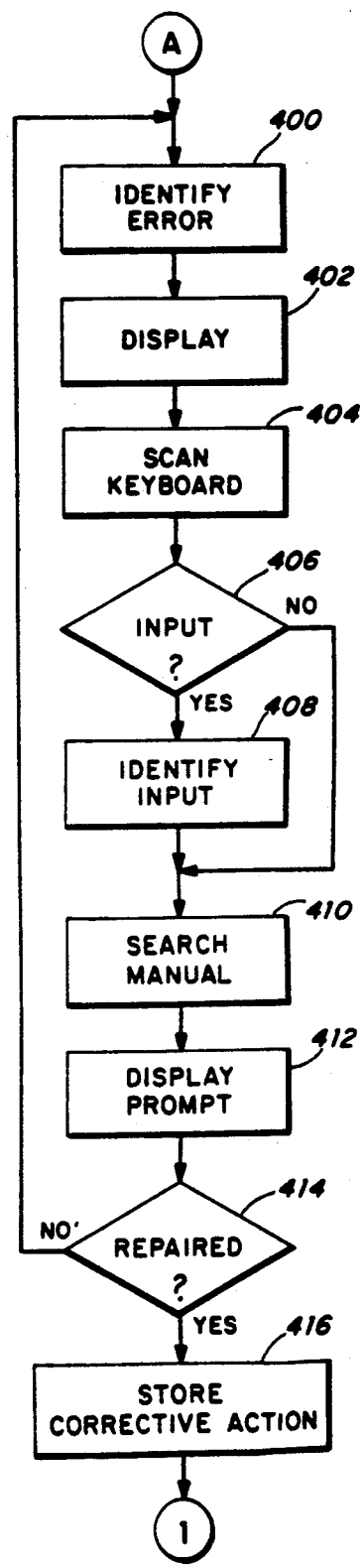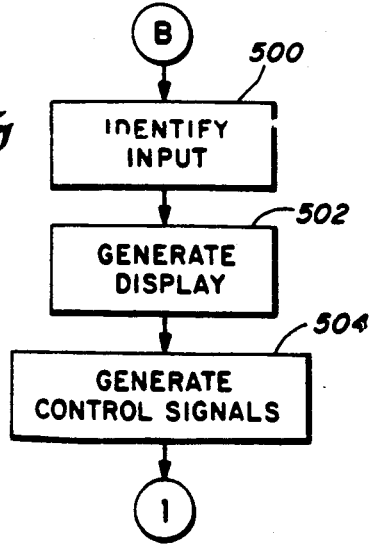

USER INTERACTIVE EXPERT MACHINE CONTROLLER

FIELD OF THE INVENTION

The present invention relates generally to a microprocessor based control circuit for a machine and more particularly to a microprocessor based control circuit adapted for receiving user input selections and for controlling the machine responsive to user input selections.

DESCRIPTION OF THE PRIOR ART

Microprocessor based circuits for controlling machines are known. For example, U.S. Pat. No. 4,245,309 issued Jan. 13, 1981 discloses a control circuit for dishwashers and clothes washers including a microprocessor programmed to respond to user selected options to determine the operating sequence of the appliance and having a diagnostic routine in which operative cycles and appliance malfunctions, if any, are displayed on a control panel as the diagnostic routine is executed. As shown in FIG. 2, the control panel includes a plurality of membrane switches for receiving predetermined user selected options and an light emitting diode (LED) located adjacent each membrane switch for indicating that the control circuit has accepted the particular user selected option.

U.S. Pat. No. 4,245,310 issued Jan. 13, 1981 discloses a microprocessor based control circuit for washing appliances including an overfill system which permits the microprocessor to detect and identify a flood condition in response to a signal from a float assembly.

A conversational voice command control system for a home appliance is disclosed by U.S. Pat. No. 5,520,576 issued Jun. 4, 1985. The disclosed control system recognizes predetermined voice commands and emits synthesized speech sounds, in an interaction with a user, to obtain the input necessary for setting the operating parameters.

While the above control systems may perform generally satisfactorily for their intended functions, it is desirable to provide an improved controller for a machine having the capability to more efficiently perform various diverse functions and that facilitates an extremely large number of user input selections without requiring a complex control panel having a corresponding extremely large number switches for receiving the desired user input selections.

SUMMARY OF THE INVENTION

A principal object of the present invention is to provide an improved machine controller apparatus adapted for simple, effective, efficient and reliable control operation. Among other important objects of the present invention are to provide such an improved machine controller apparatus that eliminates the need for either an operating manual or a service manual for the machine being controlled; to provide such an improved machine controller apparatus that facilitates repair and periodic maintenance and that facilitates increased control capability and flexibility over prior art control systems.

In brief, the objects and advantages of the present invention are achieved by a machine control apparatus comprising a processor device for performing a plurality of predetermined control and logical operations. Memory is coupled to the processor device for storing predetermined machine characteristic data and a user input device is coupled to the processor device for receiving user input selections. The processor device is responsive to both the predetermined machine characteristic data stored by the memory and a received predefined one of the user input selections for performing at least one of the plurality of predetermined control and logical operations. A display device is coupled to the processor device for displaying a plurality of menu-specific user input selections responsive to the received predefined one of the user input selections.

BRIEF DESCRIPTION OF THE DRAWINGS

The present invention together with the above and other objects and advantages may best be understood from the following detailed description of the embodiment of the invention illustrated in the drawings, wherein:

FIGS. 3-5 are flow charts illustrating the logical steps performed by the machine control apparatus of FIG. 1.

DETAILED DESCRIPTION OF THE PREFERRED EMBODIMENT

Figure 1:
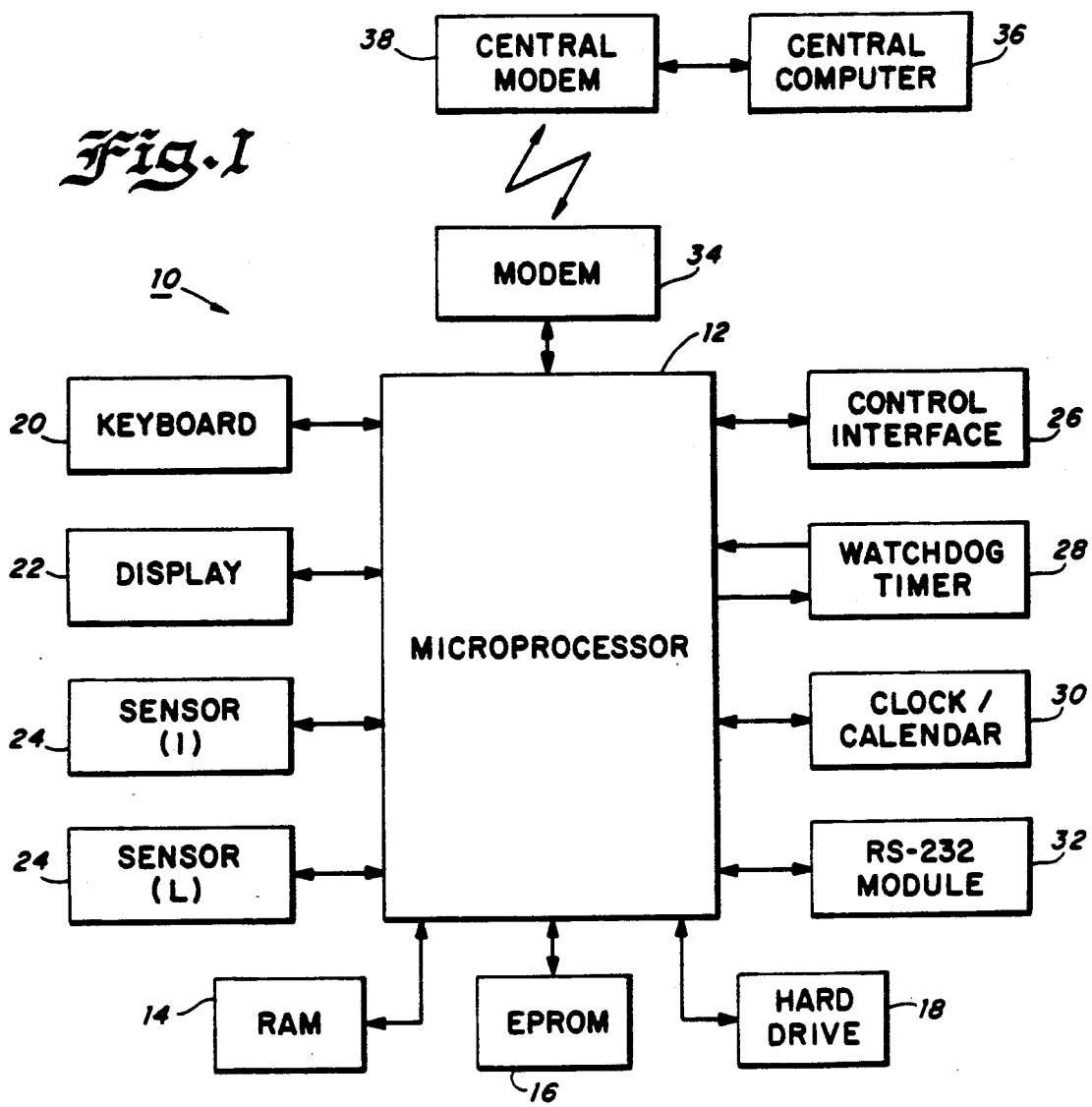
FIG. 1 is a block diagram representation of machine control apparatus according to the present invention.

Referring now to the drawings, in FIG. 1 there is illustrated a block diagram representation of a machine control apparatus generally designated by the reference character 10. While the machine control apparatus 10 is described below for use in conjunction with a washer extractor, it should be understood that the machine control apparatus 10 is not limited to this particular application.

As illustrated in FIG. 1, the machine control apparatus 10 includes a central processing unit 12 and a plurality of associated memory devices designated as a random access memory (RAM) 14, an electrically programmable read only memory (EPROM) 16, and a hard memory device (HARD DRIVE) 18. To facilitate both normal operations and repair, a complete operating manual for the machine advantageously is stored by the EPROM 16.

A keyboard 20 is coupled to the central processing unit 12 for manual operation by the user for entering various user selections and operational data. A display 22 is coupled to the central processing unit 12 for displaying machine characteristic data. A predetermined section of the display 22 provides menu-specific indicia representative of the user selected functions that can be entered via the keyboard 20. Various commercially available monitors can be used for the display 22, such as a monitor having an 80 column by 25 line display. For example, the keyboard 20 advantageously includes a small number of keys, such as F1-F9, as illustrated in the screen shown in FIG. 2. Each key F1-F9 represents various multiple, predefined functions with each predefined function corresponding to a predetermined menu. The operating manual stored by the EPROM 16 can be selected by the user entry selections via keyboard 20 and displayed and scanned page by page by the display 22.

A plurality of sensors (1)–(L) designated by the reference character 24 are coupled to the processor 12 and monitor a plurality of predetermined machine operating conditions. Each sensor 24 provides a sensed signal to the processor 12 representative of a particular one of the predetermined machine operating conditions. A control interface block 26 is coupled between the processor 12 and the controlled machine for applying predetermined control signals generated by the processor 12 for controlling predetermined machine operational functions. A watchdog timer 28 coupled to the processor 12 returns the processor I/O to a default state after processor errors and automatically reboots the processor 12 after failure. A clock calendar device 30 coupled to the processor 12 provides a real time clock signal. An RS-232 serial communications module 32 and a modem 34 are coupled to the processor 32. Modem 34 enables communications with a central computer 36 via a modem 38 coupled to the central computer 36 and a telephone network. The central computer 36 can be used for data retrieval from the control apparatus 10, for example, such as for ordering replacement parts needed for repair. Also remote reprogramming or update programming can be provided by the central computer 36 via modem connection 34, 38.

The machine control apparatus 10 can be implemented by a personal computer system, for example, such as, an IBM PC with an associated hard disk drive 70M bytes memory, or various other commercially available microcomputer based systems.

Figure 2:
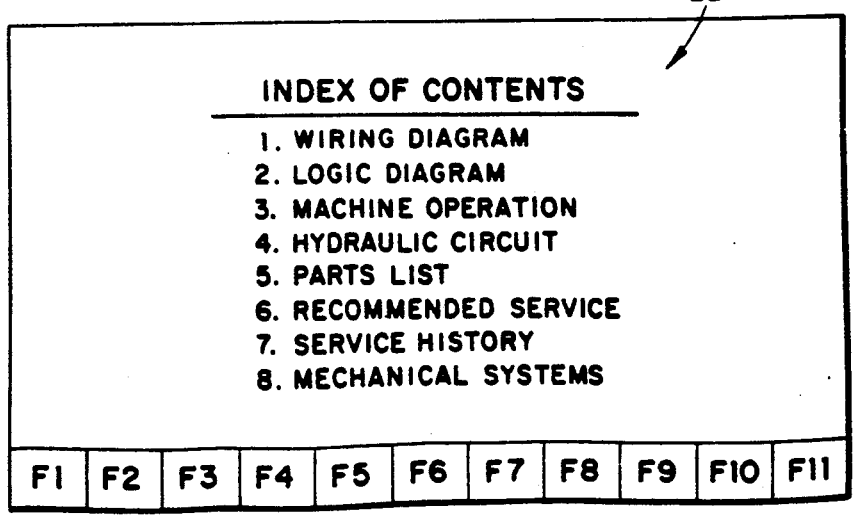
FIG. 2 is graphical representation of a screen display of the machine control apparatus of FIG. 1.

Referring now to FIG. 2, there is shown an exemplary screen displayed by the display 22 including an index of contents for the operating manual stored by EPROM 16 and indicia F1-F9 for the keyboard 20. Display 22 is operatively driven by the microprocessor 12 for reporting operational status and menu specific functional input selections to the user. Sequential menu screens are displayed responsive to user input selections and the predetermined machine operating conditions sensed by the multiple sensors 24.

Referring now to FIGS. 3-5, there are shown flow charts generally illustrating the logical steps performed by the machine control apparatus 10. After power-up indicated at a block 300, the sequential steps starts with an INITIALIZATION routine performed indicated at a block 302. The INITIALIZATION routine includes loading initial and default values. A first screen MENU 1 is displayed indicated at a block 304. Next the sensors 24 are polled indicated at a block 306. Any error condition in the machine operating conditions sensed by the multiple sensors 24 is identified indicated at a block 308. When an error condition is identified at the block 308, the sequential operations continue following an entry point A illustrated and described with respect to FIG. 4.

Otherwise when an error condition is not identified at the block 308, next an update timer routine is performed indicated at a block 310. Then the updated timer value is compared with a set time for service or repair maintenance indicated at a block 312. When the set time is identified at the block 312, then a prompt is displayed to notify the user of the scheduled service needed indicated at a block 314. Then the sequential operation return to poll sensors 24 at the block 306. Otherwise when the set time is not identified, then the keyboard 20 is scanned indicated at a block 316. A user input selection is identified at a block 318. When a user input selection is not identified, then the sequential operation return to poll sensors 24 at the block 306. Otherwise when a user input selection is identified, then the sequential operation continue following an entry point B illustrated and described with respect to FIG. 5.

FIG. 4 begins with identifying the particular error indicated at a block 400 and displaying an error prompt for the user indicated at a block 402. Then the keyboard 20 is scanned indicated at a block 404 and a user input selection is identified at a block 406 and at a block 408. Next a search of the manual stored by the EPROM 16 is performed indicated at a block 410 responsive to the identified error at block 400 and also responsive to the user input selection when identified at the block 408. A prompt is displayed for the user indicated at a block 412. Next it is determined whether a corrective repair action has been made indicated at a block 414. When a corrective repair action is identified at the block 414, then the corrective action is stored in the EPROM 16 and the sequential operations continue following entry point 1 in FIG. 3. Otherwise when a corrective action is not identified at the block 414, then the sequential operations return following the entry point A.

FIG. 5 illustrates the sequential steps performed following an identified keyboard entry at the block 318 in FIG. 3. First a keyboard entry for a particular screen being displayed is identified at a block 500. Next a screen is generated and displayed indicated at a block 502 responsive the identified keyboard entry identified at the block 500. Control signals are generated for controlling the machine indicated at a block 504. Sequential operations continue following entry point 1 in FIG. 3.

While the invention has been described with reference to details of the illustrated embodiment, these details are not intended to limit the scope of the invention as defined in the appended claims.

I claim:

1. A machine control apparatus comprising:

processor means for performing a plurality of predetermined control and logical operations;

memory means coupled to said processor means for storing predetermined machine characteristic data including an operating manual including a wiring diagram for the machine;

user input means coupled to said processor means for receiving user input selections;

said processor means being responsive to both said predetermined machine characteristic data stored by said memory means and a received predefined one of said user input selections for performing at least one of said plurality of predetermined control and logical operations; and display means coupled to said processor means for displaying a plurality of menu-specific user input selections responsive to said received predefined one of said user input selections.

2. A machine control apparatus as recited in claim 1 further includes sensor means coupled to said processor means for detecting predetermined machine operating conditions.

3. A machine control apparatus as recited in claim 2 wherein said processor means further includes means for identifying an error condition in said detected predetermined machine operating conditions.

4. A machine control apparatus as recited in claim 3 wherein said processor means includes means for searching said operating manual.

5. A machine control apparatus as recited in claim 4 wherein said means for searching said operating manual is responsive to said user input means.

6. A machine control apparatus as recited in claim 4 wherein said means for searching said operating manual is responsive to said user input means and said identified error condition.

7. A machine control apparatus as recited in claim 3 wherein said processor means includes means for identifying and storing a corrective action in said operating manual responsive to said identified error condition.

8. A machine control apparatus as recited in claim 7 wherein said processor means includes means for displaying at least one user prompt responsive to said identified error condition and a related said stored corrective action.

9. A control apparatus for controlling a machine comprising:
processor means for performing a plurality of predetermined control and logical operations;
memory means coupled to said processor means for storing predetermined machine characteristic data including an operating manual including a wiring diagram for the machine;
user input means coupled to said processor means for receiving user input selections;
sensor means coupled to said processor means for detecting predetermined machine operating conditions;
said processor means being responsive to both said predetermined machine characteristic data stored by said memory means and a received predefined one of said user input selections for performing at least one of said plurality of predetermined control and logical operations;
said processor means including means for identifying an error condition in said detected predetermined machine operating conditions; and
said processor means including means for identifying and storing a corrective action in said memory means responsive to said identified error condition.

10. A machine control apparatus as recited in claim 9 wherein said processor means includes means for searching said operating manual.

11. A machine control apparatus as recited in claim 10 wherein said means for searching said operating manual is responsive to said user input means and said identified error condition.

12. A machine control apparatus as recited in claim 9 wherein said operating manual includes a hydraulic circuit for the machine.

13. A machine control apparatus as recited in claim 9 wherein said operating manual includes a logic diagram for the machine.

14. A machine control apparatus as recited in claim 9 wherein said processor means includes means for identifying and storing a corrective action in said operating manual responsive to said identified error condition.

15. A machine control apparatus as recited in claim 14 wherein said processor means includes means for displaying at least one user prompt responsive to said identified error condition and a related said stored corrective action.

16. A machine control apparatus as recited in claim 9 further comprising display means coupled to said processor means for displaying a plurality of menu-specific user input selections responsive to said received predefined one of said user input selections.

17. A machine control apparatus as recited in claim 16 further comprising timer means for identifying a predetermined operating time interval for the machine and said processor means including means for means for displaying at least one user prompt responsive to said identified operating time interval.

* * * * *